(12) United States Patent
Tsukui

(10) Patent No.: US 6,791,589 B2
(45) Date of Patent: Sep. 14, 2004

(54) CALENDAR DISPLAY APPARATUS, CALENDAR DISPLAY METHOD AND COMPUTER PROGRAM PRODUCT

(75) Inventor: Yasuyuki Tsukui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 515 days.

(21) Appl. No.: 09/725,109

(22) Filed: Nov. 29, 2000

(65) Prior Publication Data

US 2001/0006385 A1 Jul. 5, 2001

(30) Foreign Application Priority Data

Dec. 3, 1999 (JP) .......................................... 11-344990

(51) Int. Cl.$^7$ ................................................ G09G 5/00
(52) U.S. Cl. ...................... 345/963; 345/814; 345/841; 345/764; 705/8; 705/9
(58) Field of Search ................................ 345/763, 775, 345/814, 963, 968, 841, 844, 830, 764; 705/8, 9

(56) References Cited

U.S. PATENT DOCUMENTS 5,970,466 A * 10/1999 Detjen et al. .................. 705/8
6,018,343 A * 1/2000 Wang et al. ................. 345/733
6,262,725 B1 * 7/2001 Hetherington et al. ...... 345/733
6,347,333 B2 * 2/2002 Eisendrath et al. ......... 709/217
6,369,840 B1 * 4/2002 Barnett et al. .............. 345/853
6,442,527 B1 * 8/2002 Worthington ................... 705/8

* cited by examiner

Primary Examiner—Kristine Kincaid
Assistant Examiner—Nhon Nguyen
(74) Attorney, Agent, or Firm—Fitzpatrick, Cella, Harper & Scinto

(57) ABSTRACT

Even when all selected dates cannot be displayed on a calendar, selected states of all the selected dates can be completely displayed so as to grasp the selected states of the selected dates. Further, the selected states can be simply changed. A calendar display apparatus displays at least one of calendars which display dates and the selected state of each date on a display screen, and is capable of instructing the selected state of each date displayed to be changed, and is capable of changing the display period of the calendar to be displayed on the display screen, and decides whether or not the selected states of all the selected dates can be displayed on the displayed calendar on the basis of data indicating whether or not the date is selected and the display period of the calendar, and displays the selected dates which cannot be displayed on the displayed calendar in the form of a list on a display area in the vicinity of the displayed calendar when it is decided that the selected states of all the selected dates cannot be displayed on the displayed calendar.

28 Claims, 4 Drawing Sheets

CALENDAR DISPLAY APPARATUS, CALENDAR DISPLAY METHOD AND COMPUTER PROGRAM PRODUCT

BACKGROUND OF THE INVENTION

1. Field of the Invention

The present invention relates to a user interface upon selection of a plurality of dates by using a calendar on a display screen of a computer terminal or the like, and more particularly to a calendar display apparatus, a calendar display method and a computer program product.

2. Related Background Art

According to a well employed method as one of the prior art for selecting a plurality of dates from a calendar on the display screen of a computer terminal or the like, a calendar having buttons or soft keys for representing dates arranged on a display screen has been prepared and the buttons have been pushed by using a keyboard or a mouse to select the dates. Thus, all the selected dates have been listed up and the list has been displayed on a position except that of the calendar on the display, or the states or colors of the buttons or marks of the selected dates have been changed to express the selected states.

However, in the above described conventional method for displaying the list of all the selected dates on the position except that of the calendar on the display screen, a display area for displaying the list of the dates has always been necessary. Further, since all the selected dates are displayed in the list, an area in which the list is displayed has been undesirably increased. Still further, the position of a date button has been separate from that of the date list, so that an operation has been inconvenient and it has been difficult to understand the list at a glance.

Still further, according to another conventional method for expressing the selected states of the dates only by the states of the buttons on a calendar, if a month including the selected dates is not displayed when the month to be displayed is changed to another month, there will not be inconveniently understood which dates are selected. In this case, if many months are simultaneously displayed on the display screen to solve this issue, a large display area will be disadvantageously occupied on the display screen.

SUMMARY OF THE INVENTION

With the above described problems taken into consideration, it is an object of the present invention to provide a calendar display apparatus, a calendar display method and a computer program product having a date selecting function for completely displaying the selected states of all selected dates with a relatively small occupation of display area even when the selected dates are not accommodated in a displayed calendar month.

It is another object of the present invention to provide a calendar display apparatus, a calendar display method and a computer program product in which the selected states of all selected and displayed dates can be grasped and the selected states can be simply changed.

According to one aspect of the present invention, there is provided a calendar display apparatus, comprising: calendar display means for displaying at least one of calendars which display dates and a selected state of each date on a display screen; date selected state change instructing means for instructing the selected state of each date displayed to be changed; memory means for storing in a memory medium data indicating whether or not the date is selected; display period change instructing means for changing the display period of the calendar displayed on the display screen; deciding means for deciding whether or not the selected states of all the selected dates can be displayed on the displayed calendar on the basis of the data and the display period of the calendar; and date list display means for displaying the selected dates which cannot be displayed on the displayed calendar in the form of a list on a display area in the vicinity of the displayed calendar when it is decided that the selected states of all the selected dates cannot be displayed on the displayed calendar.

Further, according to another aspect of the present invention, there is provided a calendar display method comprising: a calendar display step of displaying at least one of calendars which display dates and the selected state of each date on a display screen; a date selected state change instructing step of instructing the selected state of each date displayed to be changed; a display period change instructing step of changing the display period of the calendar displayed on the display screen; a deciding step of deciding whether or not the selected states of all the selected dates can be displayed on the displayed calendar on the basis of data indicating whether or not the date is selected and the display period of the calendar; and a date list display step of displaying the selected dates which cannot be displayed on the displayed calendar in the form of a list on a display area in the vicinity of the displayed calendar when it is decided that the selected states of all the selected dates cannot be displayed on the displayed calendar.

Further, according to still another aspect of the present invention, there is provided a computer program product for a computer, comprising software code portions for performing the steps of: a calendar display step of displaying at least one of calendars which display dates and the selected state of each date on a display screen; a date selected state change instructing step of instructing the selected state of each date displayed to be changed; a display period change instructing step of changing the display period of the calendar displayed on the display screen; a deciding step of deciding whether or not the selected states of all the selected dates can be displayed on the displayed calendar on the basis of data indicating whether or not the date is selected and the display period of the calendar; and a date list display step of displaying the selected dates which cannot be displayed on the displayed calendar in the form of a list on a display area in the vicinity of the displayed calendar when it is decided that the selected states of all the selected dates cannot be displayed on the displayed calendar.

According to the present invention, when all the selected dates are not kept in the calendar of a displayed month, the list of the selected dates which cannot be represented on the calendar is displayed in a position near the calendar. Further, check boxes are added to individual dates in the list, so that the date which is not checked can be brought to a non-selected state.

As described above, even when all the selected dates are not kept in the calendar of the displayed month, the rest of dates appears on the list of the selected dates located in the vicinity of the calendar, an oversight can be avoided.

Further, since there are provided check boxes for avoiding the selected states in the list of the selected dates, the selected states can be changed like parts such as the check boxes adjacent to the dates on the calendar. Thus, an operation can be performed by seeing indications at a glance.

Still further, since the list of the selected dates appears when the selected dates cannot be represented on the calendar, it can be displayed only by using a minimum display area.

Furthermore, the display position of the list of the selected dates is changed depending on a selected date so that the contextual relation between the selected date and the displayed calendar month can be readily understood.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Now, referring to the accompanying drawings, embodiments of the present invention will be described in more detail.

[First Embodiment]

Figure 1:
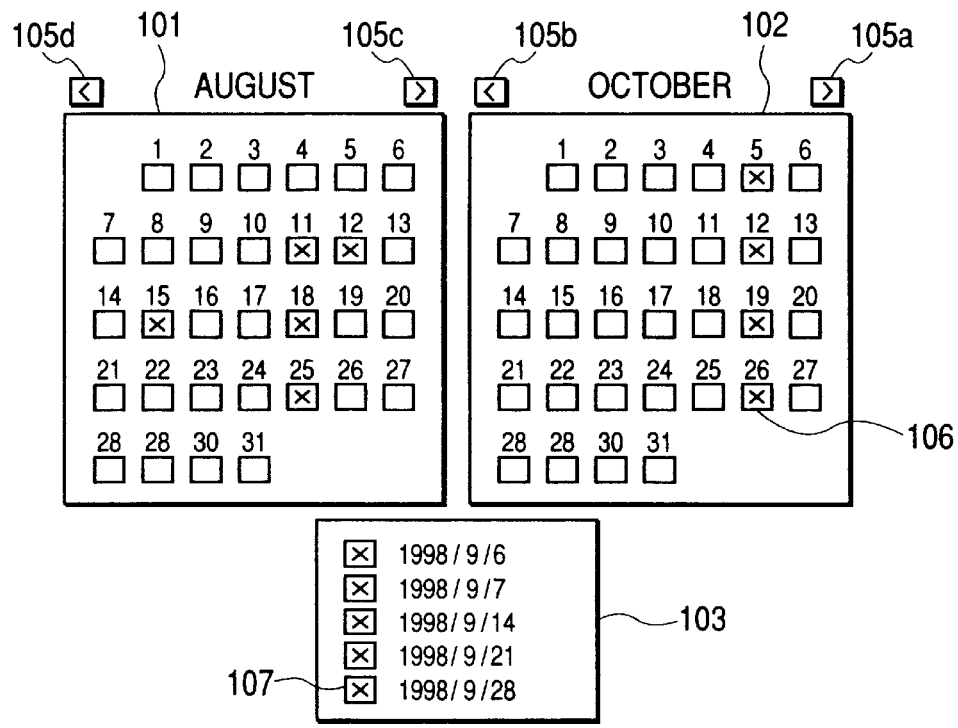
FIG. 1 shows one embodiment of the present invention showing one example of a display state when there are selected dates which are not kept in calendars of months displayed on a display screen.
Figure 2:
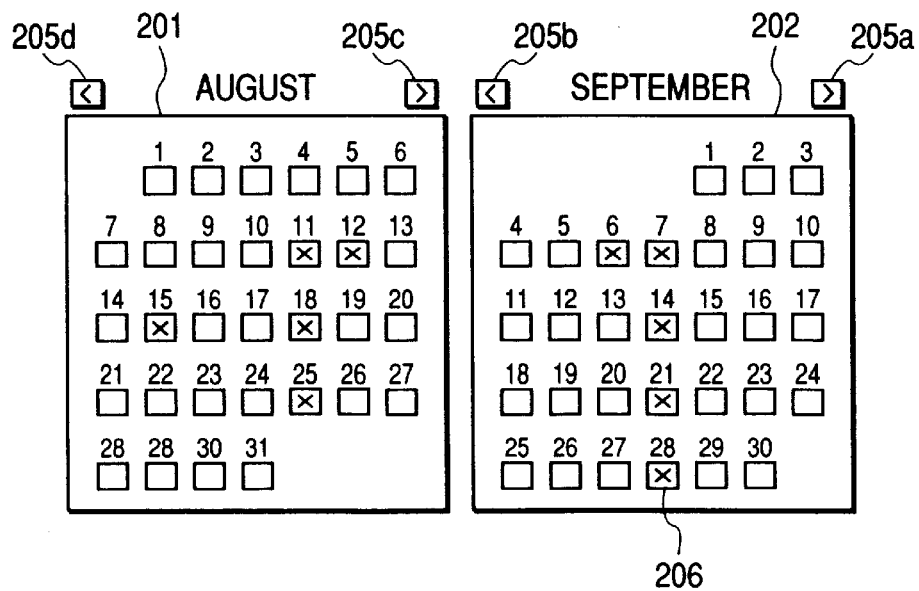
FIG. 2 shows one example of a display state when all selected dates are kept on the calendars according to one embodiment of the present invention.

FIG. 1 shows one example of a calendar display most representative of the present invention and represents a screen in which selected dates are not included in the calendars of months displayed on the display screen. On the other hand, FIG. 2 shows a display screen in which all the selected dates are incorporated on the calendars. This display screen is a kind of display screen for various kinds of electronic devices having a calendar displaying function such as a personal computer and a high function terminal equipment.

According to the embodiment shown in FIGS. 1 and 2, the calendars of two months can be simultaneously displayed on one screen. Months displayed on calendar month display areas 101, 102, 201 and 202 can be respectively independently changed to a previous month or a next month by using display month changing buttons 105a to 105d and 205a to 205d.

In FIG. 2, the calendars corresponding to August 201 and September 202 are displayed. A square box located below each date indicates a check box 206 for selecting a date. An X mark in the check box designates the mark of a date selected by a user.

When the display month change button 205a is pressed under the state shown in FIG. 2, a state in which October is displayed in place of September is shown in FIG. 1. September 6, September 7, September 14, September 21 and September 28 which are selected in FIG. 2 cannot be directly displayed on the calendar shown in FIG. 1. Thus, in order to overcome this problem, the list of the selected dates which cannot be displayed on the calendars displayed on the display screen is formed, and further, check boxes 107 for selecting dates are added respectively to the dates of the list and displayed in a selected date list part 103. X marks are initially affixed to the check boxes 107. However, when the check boxes 107 are indicated by a pointer or the like to remove the X marks, the selection of the corresponding dates is cancelled. In this case, for example, "1998/9/6" in the selected date list part 103 represents Sep. 6, 1998 and "1998/9/7" represents Sep. 7, 1998. Other dates can be expressed in a similar manner. In the present embodiment, the selected date list part 103 is displayed adjacently to the calendar month display areas 101, 102, 201 and 202.

Figure 3:
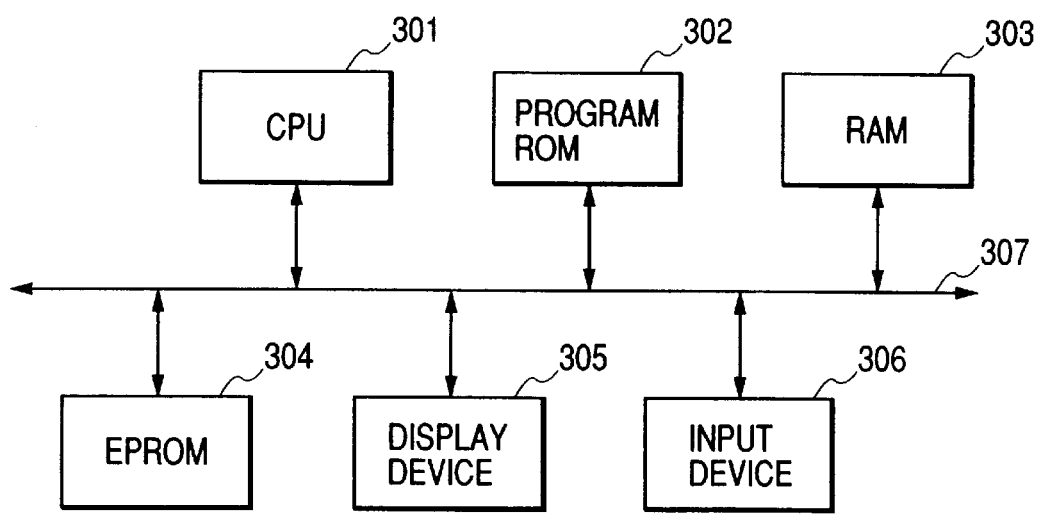
FIG. 3 is a block diagram showing a structural example of a device preferable for realizing calendar displaying and date selecting functions according to one embodiment of the present invention.

FIG. 3 shows a structural example of a preferable device for realizing the calendar displaying and date selecting functions according to the present invention shown in FIGS. 1 and 2. A calendar display apparatus according to the present embodiment comprises a CPU (central processing unit) 301 for executing the calculating and controlling operations of the whole part of the apparatus, a program ROM (read only memory) 302 for storing a control program according to the present invention as shown in a flowchart of FIG. 4 which is executed by the CPU 301, a RAM (random access memory) 303 used as the operating area of the CPU 301 and a nonvolatile memory (EPROM) 304 for storing selected date data representing the selected states of the dates. Further, reference numeral 305 denotes a display device for carrying out a calendar display as shown in FIGS. 1 and 2, such as a liquid crystal display, a CRT, etc. Reference numeral 306 denotes an input device such as a keyboard, a mouse, a track pat, a touch panel, a touch screen, etc., used for performing the above described date selected state change instruction and display period change instruction. Reference numeral 307 denotes a bus for connecting the CPU 301 to other components 302 to 306. The CPU 301 receives or transmits a control signal or data through this bus 307.

Figure 4:
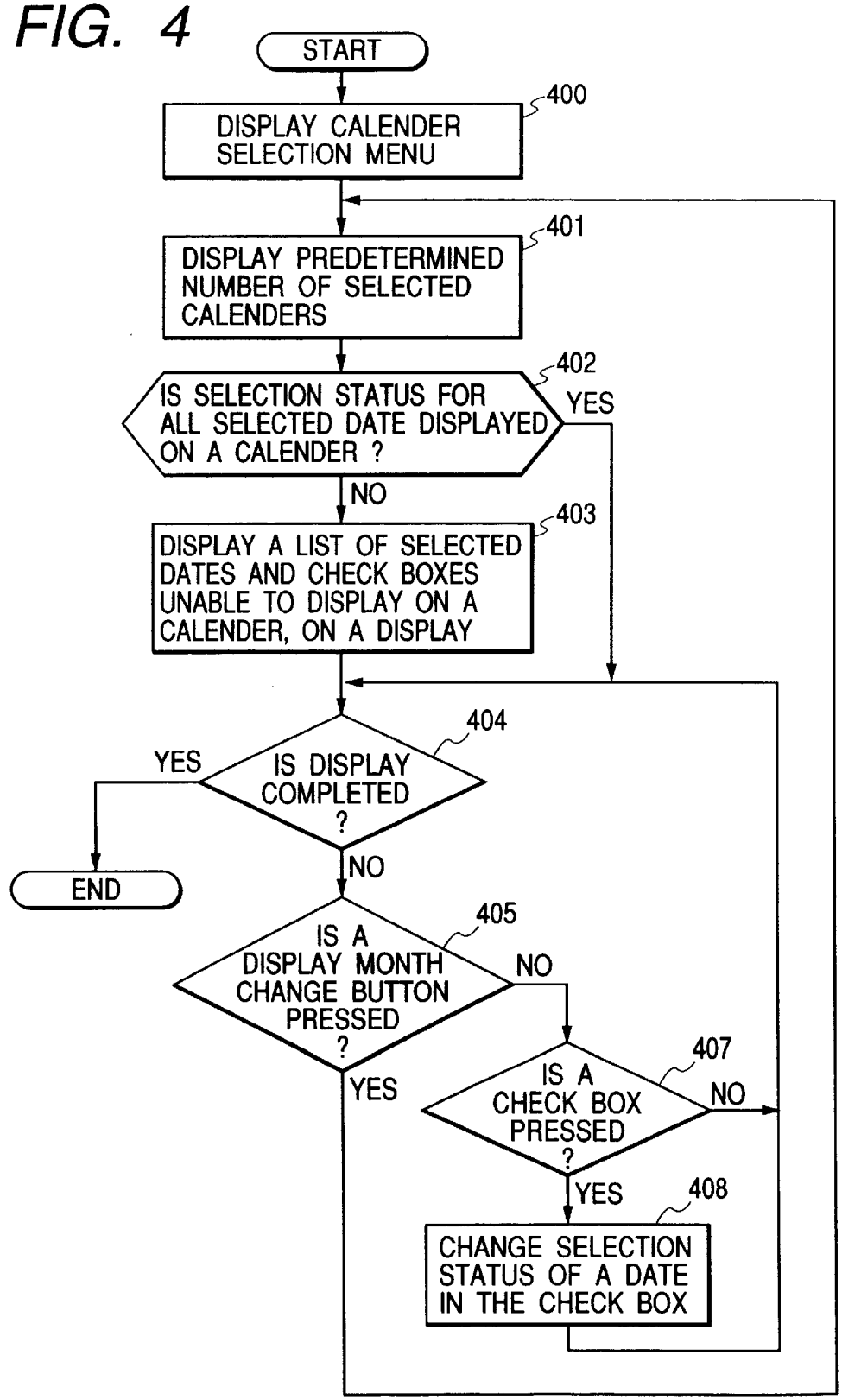
FIG. 4 is a flowchart showing one example of an operation procedure according to one embodiment of the present invention.

FIG. 4 is a flowchart showing one example of an operation procedure according to the present invention which is executed by the CPU 301. The operation procedure will be described below.

The CPU 301 first displays a calendar selection menu (not shown) on the display screen of the display device 305 in step 400. Thus, a user selects the predetermined number, that is to say, one or more of months desired to be displayed (in the embodiment shown in FIGS. 1 and 2, two calendar months are displayed in accordance with an instruction) by employing the input device 306.

Then, the CPU 301 displays the predetermined number of calendar months corresponding to the months selected by the user on the display screen of the display device 305 in step 401, as shown in FIG. 2. At this time, the CPU 301 reads the selected date data stored in the EPROM 304 and displays the X marks in the check boxes of already selected dates.

Subsequently, the CPU 301 decides based on the selected date data representing the selected states of dates stored in the EPROM 304 whether or not all the selected dates are displayed on the calendars displayed on the display screen of the display device 305 under selected conditions in which the check boxes on the displayed calendar months are filled with the X marks in step 402. When the CPU 301 decides that the selected states of all the selected dates are displayed on the calendars, the CPU 301 directly advances to step 405 through step 404.

On the other hand, in step 402, when the CPU 301 decides that the selected states of all the selected dates are not displayed on the calendars, the CPU 301 forms the list of the selected dates which cannot be displayed on the calendars and the check boxes and displays the list on the selected date list part 103 of the display device 305 in step 403 as shown in FIG. 1. Then, the CPU 301 advances to step 405 through step 404.

In step 405, the CPU 301 decides whether or not the display month changing buttons 105a to 105d and 205a to 205d are pressed. When the display month changing buttons are not pressed, the CPU 301 moves to step 407. When the display month buttons are pressed, the CPU 301 returns to the above described step 401.

In the step 407, the CPU 301 decides whether or not the check boxes 106, 107 and 206 for selecting no date are pressed. When the check boxes are not pressed, the CPU 301 returns to the step 404. When the check boxes are pressed, the CPU 301 changes and displays the selected states of dates of the check boxes and rewrites selected date data representing the selected states of dates stored in the EPROM 304 in step 408 and returns to the step 404.

In the case where the check boxes for selecting no date which are blank columns on the calendar are pressed, the X marks indicating the selection are displayed. In the case where the check boxes for selecting no date which are filled with the X marks are pressed, the check boxes are changed to the blank columns. Further, when the check boxes for selecting no date which are filled with the X marks in the list part 103 are pressed, the check boxes are changed to the blank columns to cancel their selection. In the present embodiment, the dates the selections of which are cancelled in the check boxes 107 are not deleted from the selected date list part 103 and the check boxes are displayed as the blank columns within a predetermined period, in other words, while a prescribed time passes or while the display month changing buttons 105a to 105d and 205a to 205d are instructed to change the display months. While the dates whose selections are cancelled are displayed in the selected date list 103, they can be selected again by instructing the check boxes again.

In step 404, the CPU 301 decides whether or not an instruction for completing the calendar display is inputted. When the instruction is inputted, the CPU 301 ends this procedure to return to a prescribed main routine.

[Other Embodiments]

Figure 5:
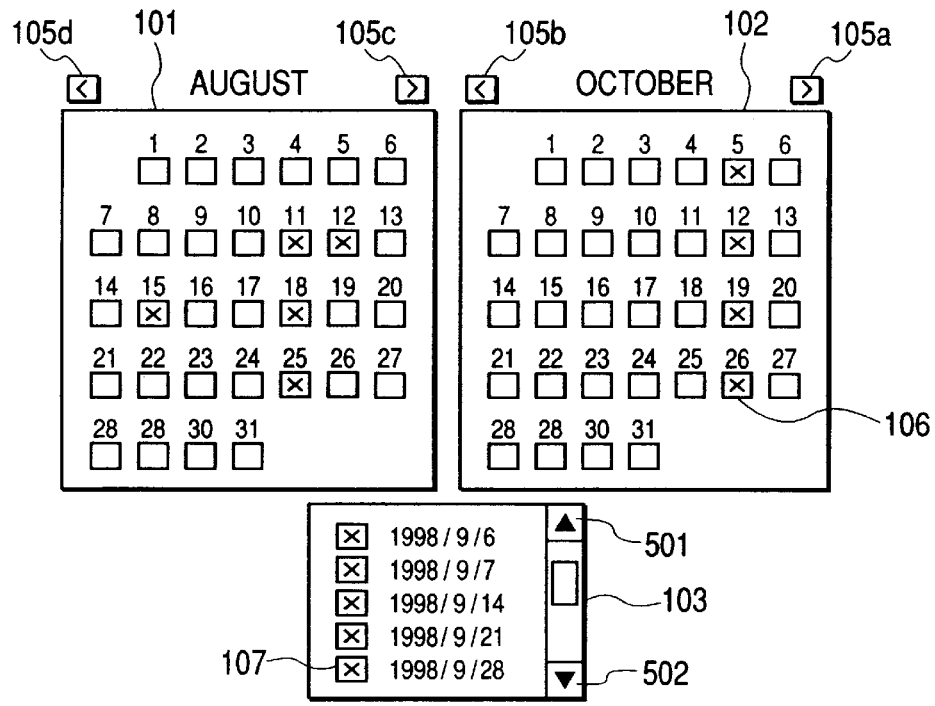
FIG. 5 shows one embodiment of the present invention in which roll-up and roll-down boxes are provided in a selected date list part.

If the size of the selected date list part 103 is fixed or a maximum size thereof is restricted and the number of selected dates is increased so that all the selected dates cannot be displayed, a roll-up box 501 for scrolling and a roll-down box 502 may be displayed in the vicinity of the selected date list part 103, as shown in FIG. 5. Then, these boxes may be pressed so that the contents of the list displayed on the display screen of the display device 305 can be rolled down or rolled up to recognize a selected date according to an instruction input to scroll.

Further, in the first embodiment, although the selected date list part 103 is displayed in the position adjacent to the lower part of the central part of the calendar month display areas 101, 102, 201 and 202, it is to be understood that the position of the list part 103 is not limited thereto. For example, a plurality of lists may be displayed as selected date list parts 601 to 603 shown in FIG. 6. Further, the dates of a month before months displayed on the calendar month display areas 101, 102, 201 and 202 may be displayed in the selected date list part 601 in the left side, the dates of the month located between the months displayed on the calendar month display areas may be displayed in the central selected date list part 602 and the dates of months after the months displayed on the calendar month display areas 101, 102, 201 and 202 may be displayed in the selected date list part 603 in the right side.

Still further, when the check box 107 of the date displayed in the selected date list part 103 is instructed to cancel its selection in the step 408 shown in FIG. 4, the date whose selection is cancelled may be immediately deleted from the selected date list part 103.

Further, in the steps 400 and 401 shown in FIG. 4, although the initially displayed calendar month is selected, a predetermined month may be displayed in place thereof. For instance, a month including a present date and a next month may be displayed.

Still further, the present invention may be applied to a system comprising a plurality of devices (for example, a host computer, an interface device, a reader, a printer, etc.) or to an apparatus comprising one device (for example, a note type personal computer, a copying machine, a facsimile equipment, a portables information terminal equipment, etc.).

Still further, needless to say, the object of the present invention can be achieved by a method in which a recording medium or a memory medium on which the program codes of a software for realizing the functions of the above described embodiments are recorded is supplied to the system or the apparatus, and the program codes stored in the recording medium are read out and executed by the computer of the system or the apparatus (or a CPU or an MPU).

In this case, the program codes themselves read out from the recording medium realize the functions of the above described embodiments and the recording medium on which the program codes are recorded configures the present invention.

As the recording medium for recording the program codes and variable data such as tables, for instance, a floppy disk (FD), a hard disk, an optical disk, a magneto-optic disk, a CD-ROM, a CD-R, a magnetic tape, a nonvolatile memory card (IC memory card), a ROM, etc. can be utilized.

Further, a computer-readable program which realizes the present invention may be externally read out through a network or the like and executed by the CPU 301.

Still further, the program codes read by the computer are executed so that not only the functions of the above described embodiments can be realized, but also an operating system OS operated on the computer on the basis of the instruction of the program codes can perform a part or all of actual processings and, needless to say, the functions of the above described embodiments can also be realized by the processings.

As described above, according to the present invention, even when all the selected dates are not included in the calendars of the displayed months, the rest of dates always appears on the selected date list adjacent to the calendars. Accordingly, an oversight can be avoided.

Still further, according to the present invention, there are provided check boxes for avoiding the selected states in the selected date list, so that the selected states can be changed like parts such as the check boxes adjacent to the dates on the calendar. Thus, the selected states of the selected dates can be understood at a glance.

Still further, according to the present invention, since the selected date list appears only when the selected dates cannot be displayed on the calendar, the selected date list can be displayed only by using a minimum display area.

Figure 6:
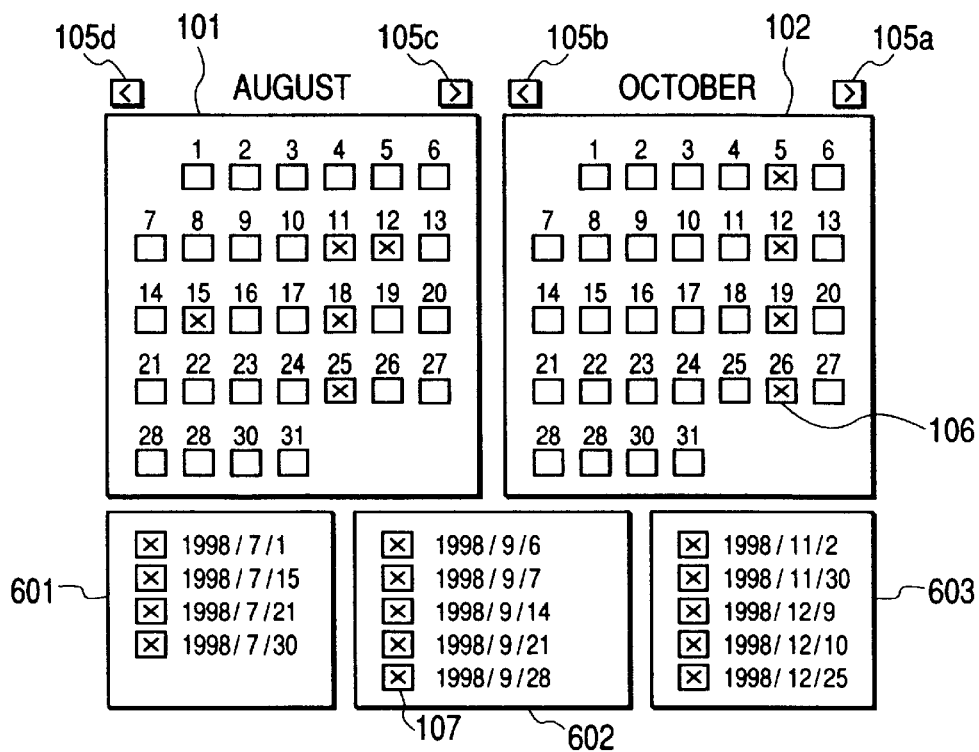
FIG. 6 shows one example of a display state when the selected dates are not kept in the calendars of months displayed on a display screen according to one embodiment of the present invention.

Besides, as shown in FIG. 6, since the position for displaying the selected date list is changed depending on the selected dates, the contextual relation between the selected dates and the displayed calendar months can be more readily understood.

What is claimed is:

1. A calendar display apparatus, comprising:

calendar display means for displaying at least one calendar which displays dates for a display period and a selected state of each date on a display screen, the selected state of each date indicating whether each date is selected or non-selected;

date selected state change instructing means for instructing the selected state of each date in the displayed calendar to be changed;

memory means for storing in a memory medium data of the selected state indicating whether or not said date is selected, based on an instruction of said date selected state change instructing means;

display period change instructing means for changing the display period of the calendar displayed on the display screen;

deciding means for deciding whether or not the selected states of all the selected dates can be displayed on the displayed calendar in the changed display period on the basis of said data of the selected state and said changed display period of the calendar; and date list display means, when it is decided that the selected states of all selected dates cannot be displayed on the displayed calendar in the changed display period, for displaying the selected dates which cannot be displayed on the displayed calendar in the changed display period in the form of a list on a display area in the vicinity of the displayed calendar.

2. The calendar display apparatus according to claim 1, wherein said data stored in the memory medium is updated and stored every time said date selected state change instructing means instructs the selected state of the date to be changed.

3. The calendar display apparatus according to claim 1, wherein said date selected state change instructing means can instruct the selection of the respective dates displayed on the list by the date list display unit to be cancelled.

4. The calendar display apparatus according to claim 1, wherein said selected state of the date is displayed by a check box corresponding to each date and the instruction of the selection and cancellation of each date is inputted through the corresponding check box.

5. The calendar display apparatus according to claim 1, further comprising scroll means capable of rolling down or rolling up the list displayed by said date list display means.

6. The calendar display apparatus according to claim 1, further comprising calendar selecting means for selecting one or more of desired calendars to be displayed from a calendar selection menu displayed on the display screen, wherein said calendar display means displays the calendar selected by the calendar selecting means.

7. The calendar display apparatus according to claim 1, wherein said date list display means divides the list of said selected dates into plural lists of said selected dates and displays the plural lists of said selected dates.

8. The calendar display apparatus according to claim 1, wherein said date list display means changes a position in which the list of selected dates is displayed on the basis of said calendar and the selected dates which cannot be displayed on the calendar.

9. The calendar display apparatus according to claim 1, wherein said date selected state change instructing means and said display period change instructing means input their instructions by using an input device including a keyboard, a mouse, a track pat, a touch panel, or a touch screen.

10. The calendar display apparatus according to claim 1, wherein said calendar display apparatus is included as a part of various kinds of electronic devices operating by using a computer.

11. A calendar display method, comprising:

a calendar display step of displaying at least one calendar which displays dates for a display period and the selected state of each date on a display screen the selected state of each date indicating whether each date is selected or non-selected;

a date selected state change instructing step of instructing the selected state of each date in the displayed calendar to be changed;

a storing step of storing in a memory medium data of the selected state indicating whether or not said date is selected, based on an instruction in said date selected state change instructing step;

a display period change instructing step of changing the display period of the calendar displayed on the display screen;

a deciding step of deciding whether or not the selected states of all the selected dates can be displayed on the displayed calendar in the changed display period on a basis of said data of the selected state and said changed display period of the calendar; and a date list display step, when it is decided that the selected states of all selected dates cannot be displayed on the displayed calendar in the changed display period, of displaying the selected dates which cannot be displayed on the displayed calendar in the changed display period, in the form of a list on a display area in the vicinity of the displayed calendar.

12. The calendar display method according to claim 11, further comprising a step of storing the data indicating whether or not the date is selected in a memory medium every time the selected state of the date is instructed to be changed in said date selected state change instructing step.

13. The calendar display method according to claim 11, wherein said date selected state change instructing step can instruct the selection of the respective dates displayed on the list in the date list display step to be cancelled.

14. The calendar display method according to claim 11, wherein said selected state of the date is displayed by a check box corresponding to each date and the instruction of the selection and cancellation of each date is inputted through the corresponding check box.

15. The calendar display method according to claim 11, further comprising a scroll step capable of rolling down or rolling up the list displayed by said date list display step.

16. The calendar display method according to claim 11, further comprising a calendar selecting step of selecting one or more of desired calendars to be displayed from a calendar selection menu displayed on the display screen, wherein said calendar display step displays the calendar selected by the calendar selecting step.

17. The calendar display method according to claim 11, wherein said date list display step divides the list of dates into a plurality of lists of said selected dates and displays the plural lists of said selected dates.

18. The calendar display method according to claim 11, wherein said date list display means changes a position in which the list of selected dates is displayed on the basis of said calendar and the selected dates which cannot be displayed on the calendar.

19. A computer program product for a computer, comprising software code portions for performing the steps of:
   a calendar display step of displaying at least one calendar which displays dates for a display period and a selected state of each date on a display screen, the selected state of each date indicating whether each date is selected or non-selected;
   a date selected state change instructing step of instructing the selected state of each date in the displayed calendar to be changed;
   a storing step of storing in a memory medium data of the selected state indicating whether or not said date is selected, based on an instruction in said date selected state change instructing step;
   a display period change instructing step of changing the display period of the calendar displayed on the display screen;
   a deciding step of deciding whether or not the selected states of all the selected dates can be displayed on the displayed calendar in the changed display period, on the basis of said data of the selected state and said changed display period of the calendar; and
   a date list display step, when it is decided that the selected states of all the selected dates cannot be displayed on the displayed calendar in the changed display period, of displaying the selected dates which cannot be displayed on the displayed calendar in the changed display period in the form of a list on a display area in the vicinity of the displayed calendar.

20. The computer program product according to claim 19, further comprising a step of storing the data indicating whether or not the date is selected in a memory medium every time the selected state of the date is instructed to be changed in said date selected state change instructing step.

21. The computer program product according to claim 19, wherein said date selected state change instructing step can instruct the selection of the respective dates displayed on the list in the date list display step to be cancelled.

22. The computer program product according to claim 19, wherein said selected state of the date is displayed by a check box corresponding to each date and the instruction of the selection and cancellation of each date is inputted through the corresponding check-box.

23. The computer program product according to claim 19, further comprising a scroll step capable of rolling down or rolling up the list displayed in said date list display step.

24. The computer program product according to claim 19, further comprising a calendar selecting step of selecting one or more of desired calendars to be displayed from a calendar selection menu displayed on the display screen, wherein said calendar display step displays the calendar selected in the calendar selecting step.

25. The computer program product according to claim 19, wherein said date list display step divides the list of said selected dates into a plurality of lists of said selected dates and displays the plural lists of said selected dates.

26. The computer program product according to claim 19, wherein said date list display means changes a position in which the list of selected date is displayed on the basis of said calendar and the selected dates which cannot be displayed on the calendar.

27. A computer program product according to claim 19, wherein said computer program product comprises a computer-readable medium on which said software code portions are stored.

28. A computer program product according to claim 19, wherein said computer program product is directly loadable into the internal memory of the computer.

* * * * *

UNITED STATES PATENT AND TRADEMARK OFFICE
CERTIFICATE OF CORRECTION

PATENT NO. : 6,791,589 B2
DATED : September 14, 2004
INVENTOR(S) : Yasuyuki Tsukui It is certified that error appears in the above-identified patent and that said Letters Patent is hereby corrected as shown below:

Drawings,
Sheet 3, Figure 4, "CALENDER" should read -- CALENDAR --; "CALENDERS" should read -- CALENDARS --; "CALENDER ?" should read -- CALENDAR? -- and "CALENDER," should read -- CALENDAR, --.

Column 6,
Line 28, "portables" should read -- portable --.

Column 10,
Line 12, "check-box." should read -- check box. --

Signed and Sealed this

Twenty-first Day of June, 2005

JON W. DUDAS
*Director of the United States Patent and Trademark Office*